Aug. 1, 1944.   H. L. PRANGE   2,354,772
LENS
Filed Sept. 2, 1941

INVENTOR.
Horace L. Prange
BY Earl & Chappell
ATTORNEYS.

Patented Aug. 1, 1944

2,354,772

UNITED STATES PATENT OFFICE 2,354,772

LENS

Horace L. Prange, Kalamazoo, Mich.

Application September 2, 1941, Serial No. 409,257

1 Claim. (Cl. 41—21)

This invention relates to improvements in lenses.

This invention relates to lenses for eyeglasses and particularly to lenses for rimless eyeglasses. It has for its objects:

First, to provide a new and improved lens for eyeglasses.

Second, to provide such a lens having markings thereon which do not interfere with vision through the lens and which do not disfigure the lens, but which serve to identify the lens to the manufacturer and to augment the appearance of the lens if it is used in rimless glasses.

Other objects and advantages pertaining to details and economies will appear from the description to follow. The invention is defined in the claim. A preferred embodiment of my invention is illustrated in the accompanying drawing, in which:

My improved eyeglass lens I may be of any desired shape. Around the peripheral edge 2 thereof I provide a series of spaced ornamental etched designs 3. These designs are spaced equally from the front and rear faces of the lens on the periphery thereof and are substantially uniformly spaced around the periphery.

Figure 1:
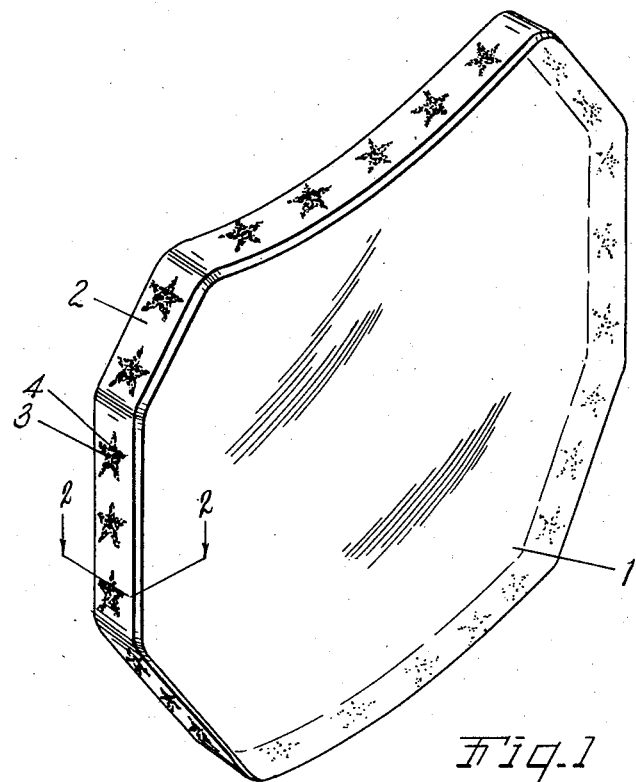
Fig. 1 is a perspective view of an eyeglass lens embodying my invention.
Figure 2:
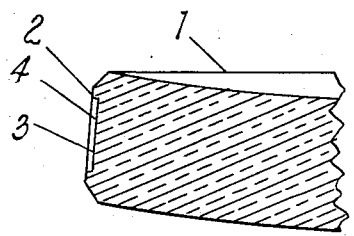
Fig. 2 is a partial sectional view taken on line 2—2 of Fig. 1.

These ornamental markings are preferably placed on the periphery of the lens by etching with finely divided abrasive material which is blown in an air blast. A mask or shield having an aperture with the desired design thereon is placed against the edge of the lens. The blast of abrasive material is directed against the other side of the shield and the abrasive material eats away the glass as shown at 4 in Fig. 2 where the eating away is slightly exaggerated.

The lens is indexed to provide the proper spacing of the ornamental designs 3 and the operation is repeated until the ornamentation is carried as far around the periphery of the lens as desired.

The lens thus marked and ornamented may be easily identified by the manufacturer in case it is returned for any reason. The markings on the lens not only serve to identify the lens, but give it a distinctive appearance which is desired by many in rimless eyeglasses.

The terms and expressions which have been herein employed are used as terms of description and not of limitation, and there is no intention in the use of such terms and expressions, of excluding any equivalents of the features shown and described. It is recognized that various modifications are possible within the scope of the invention claimed.

Having thus described my invention what I claim as new and desire to secure by Letters Patent is:

As an article of manufacture, an eyeglass lens having a plurality of ornamental etched designs in the face of the peripheral edge thereof, said ornamental designs being substantially equally spaced around the periphery and centered with respect to the sides of the lens, whereby said etched designs form an identifying medium for said lens and provide an ornamental appearance therefor without interfering with vision through said lens.

HORACE L. PRANGE.